W. E. COOKE.
GIN.
APPLICATION FILED NOV. 13, 1909.
1,008,242.
Patented Nov. 7, 1911.
2 SHEETS—SHEET 1.
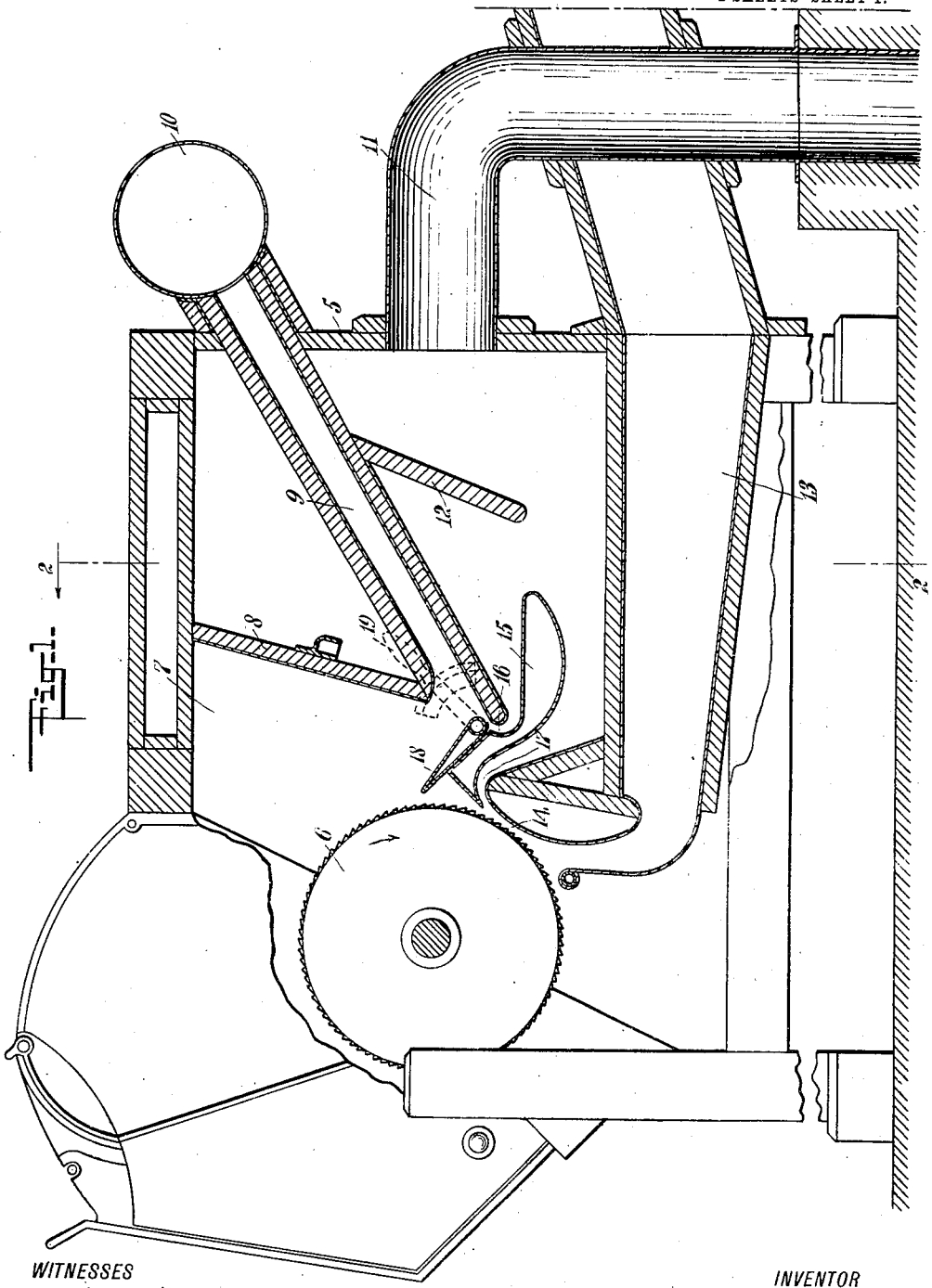
WITNESSES
INVENTOR
William E. Cooke
BY
ATTORNEYS

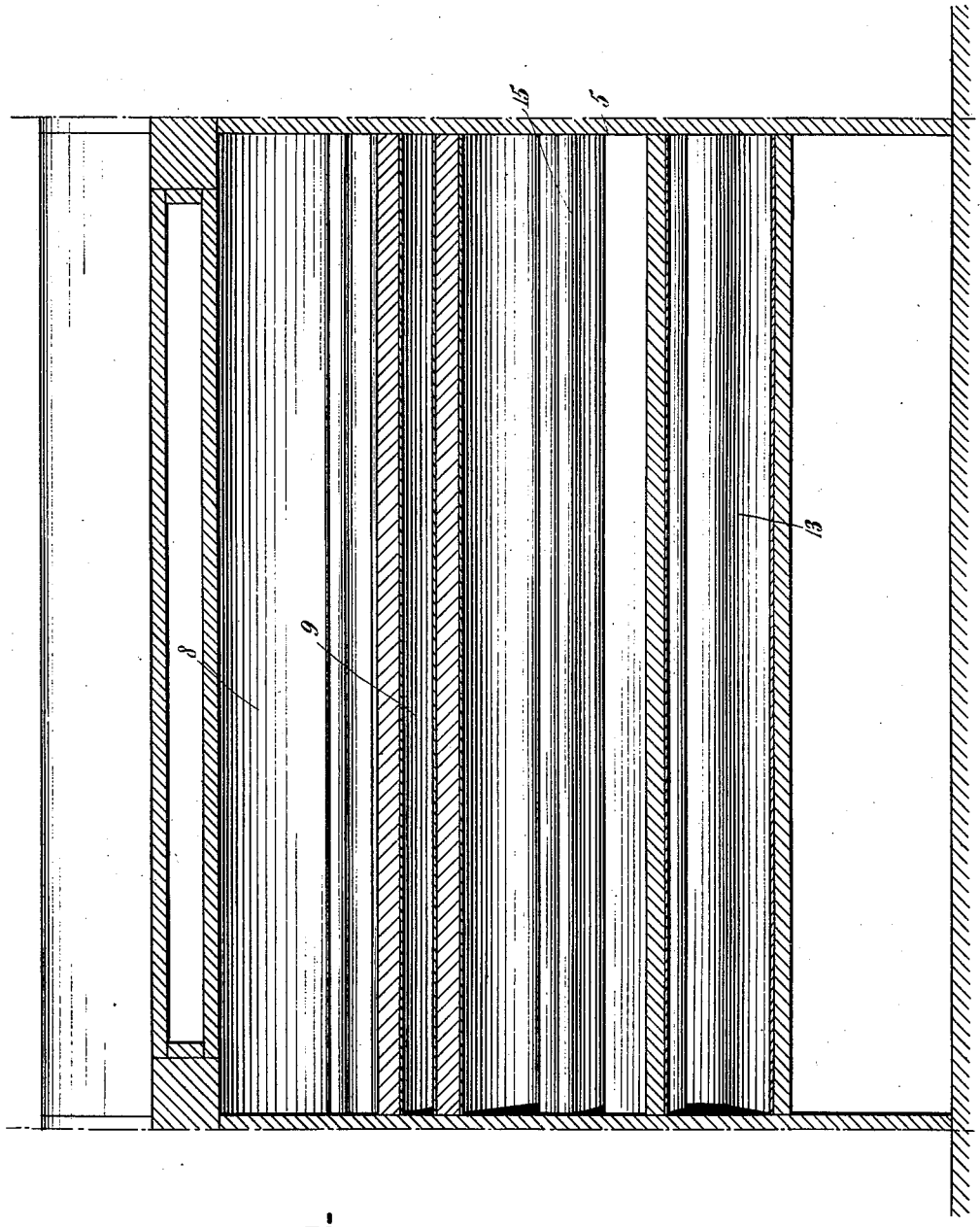

UNITED STATES PATENT OFFICE.

WILLIAM EDWARD COOKE, OF SHELLMOUND, MISSISSIPPI, ASSIGNOR OF ONE-HALF TO WALTER SLOANE WINGFIELD, OF SHELLMOUND, MISSISSIPPI.

GIN.

1,008,242.      Specification of Letters Patent.    Patented Nov. 7, 1911.

Application filed November 13, 1909. Serial No. 527,797.

*To all whom it may concern:*

Be it known that I, WILLIAM E. COOKE, a citizen of the United States, and a resident of Shellmound, in the county of Leflore and State of Mississippi, have invented a new and Improved Gin, of which the following is a full, clear, and exact description.

The invention is an improvement in gins, and has in view an air blast gin which is arranged and constructed to first gather the dust, leaves, trash and motes which may remain in or about the cotton fiber after the seed is removed, and discharge the same by means of a division or part of the blast to the outside of the building or other remote point, and, secondly, afterward remove the cotton fiber from the saws by means of another division or the remaining portion of the air blast, and discharge this fiber by the blast into the condenser.

The invention further contemplates a whipping-board for threshing the dust from the cotton at or near the point at which the leaves, trash and motes are removed, adjustable to and from the gin saws, adapting it to long or short staple cotton, as desired.

Reference is to be had to the accompanying drawings forming a part of this specification, in which similar characters of reference indicate corresponding parts in both views.

Figure 1 is a central vertical section through that portion of the gin embodying my improvements; and Fig. 2 is a cross-section of the same substantially on the line 2—2 of Fig. 1, with the gearing and other actuating mechanism omitted.

The gin comprises a suitable frame-supported casing 5, having at the forward side thereof the gin saws 6, to which the cotton is fed. Adjoining the upper portion of the saw is a refuse chamber 7 for receiving and collecting the dust, as well as the leaves, trash and motes, which the cotton at this point contains. The rear wall of the chamber is formed by a downwardly and forwardly inclined guide-board 8, against which the trash and motes are thrown from the gin saws by centrifugal force, the lower edge of the guide-board terminating at or near the level of the saw axis and adjoining the upper wall of an upwardly and rearwardly inclined chute 9, which discharges into a pipe or duct 10, leading to the outside of the building or other point of discharge.

Leading into the rear of the gin casing under the chute 9, from the blower, is an air inlet duct or pipe 11, at the front of which and spaced a substantial distance therefrom is a downwardly and forwardly inclined deflector 12, extending from the lower wall of the chute 9, the deflector terminating a substantial distance from the upper wall of a chute 13, which leads to the condenser, the upper wall of the chute 13 at its inner end passing relatively close to the gin saw 6, leaving a contracted passage 14 therebetween, for the lint adhering to the saw teeth. Between this portion of the chute 13 and the inner portion of the chute 9 is interposed a dividing-block 15, forming at its upper side, in connection with the lower wall of the chute 9, a contracted air conduit or nozzle 16, and its lower side, in connection with the extension of the chute 13, a contracted air conduit or nozzle 17, the air conduit 16 being directed up the chute 9 and the air conduit 17 leading into the contracted passage 14 to the chute 13. The upper face of the dividing-block 15 opposite the mouth of the chute 9 is flattened and forms a seat for a whipping-board 18, the latter being preferably of wedge-form, with the sharp edge extending toward the saws, the board at its opposite end or edge being journaled or pivotally supported in the casing to swing to and from the saw so as to adapt the board to long, short and intermediate lengths of staple cotton, the board being moved and secured in any of its adjusted positions by a locking lever 19 arranged at the outside.

In the operation of the gin, the cotton passes to the gin saws 6 where the seeds have been removed, and the trash, motes, leaves, dust, etc. are thrown off in the chamber 7 by centrifugal action, the heavier pieces striking the guide-board 8 and sliding to the mouth of the chute 9, where they are blown through this chute and the duct 10, to the point of discharge, by that division of the air blast passing through the contracted opening 16, the blast creating a suction in the chamber 7 and drawing out the finer particles and dust thrown from the cotton, and also the dust beaten from the cotton against the whipping-board. The cotton fiber adhering to the saw teeth is blown off by the air blast passing through the contracted opening 17 into the chute 13, from which it is swept to the condenser. The walls of the chutes and other portions of the gin with which the cotton contacts are preferably either lined with or formed by sheet metal in order to lessen the friction so far as possible.

Having thus described my invention, I claim as new and desire to secure by Letters Patent:

1. In a cotton gin, a gin saw, a dust chamber adjoining the upper portion of the saw and having a downwardly and forwardly inclined rear wall, a chute leading from the dust chamber at the lower terminus of said wall, a chute leading from a point adjacent to the saw below the dust chamber, an air supply duct discharging into the gin between the chutes, a downwardly and forwardly inclined deflector arranged at the front of the duct, and a dividing-member arranged between the chutes and forming in connection therewith air blast passages respectively directed to blow the dust, motes, etc. from the chamber through the first mentioned chute and blow the cotton adhering to the saw teeth into the last-named chute.

2. In a cotton gin, a gin saw, a dust chamber adjoining the upper portion of the saw, a whipping-board at the bottom of the chamber and mounted to swing to and from the saw, a dust chute leading from the lower portion of the chamber at the back of the whipping-board, and an air blast to expel the dust, motes, etc. from the chute, passing in between the whipping-board and the bottom wall of the chute.

In testimony whereof I have signed my name to this specification in the presence of two subscribing witnesses.

WILLIAM EDWARD COOKE.

Witnesses:
 B. P. CHATHAM,
 C. W. CROCKETT.